Feb. 20, 1934.                J. G. AUPERIN                1,948,196
                         AUTOMOBILE LOCKING DEVICE
                         Filed Aug. 17, 1928        2 Sheets-Sheet 1
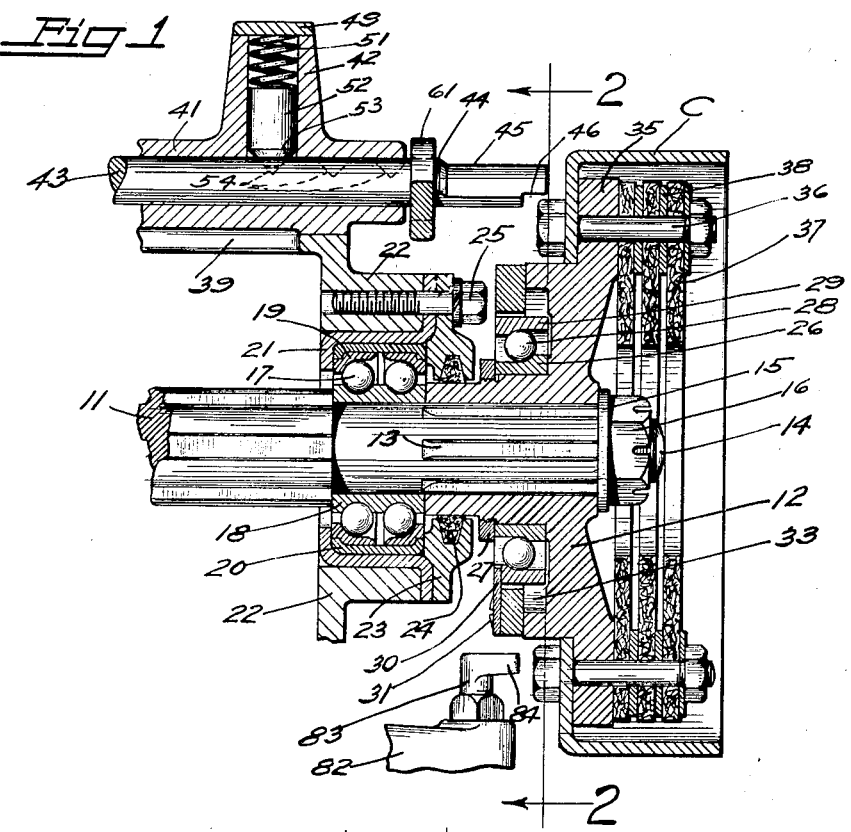
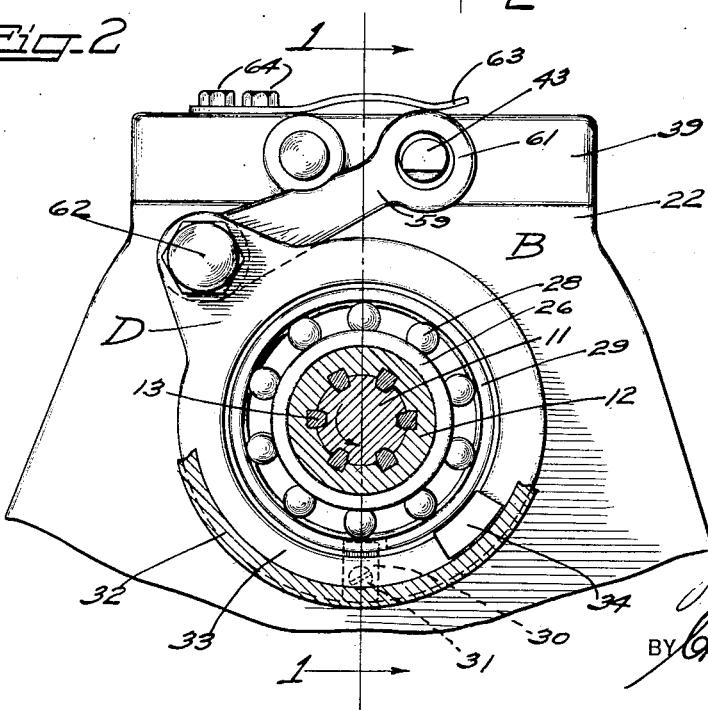
Jean G. Auperin
INVENTOR
BY Charles H. Ennis
ATTORNEY

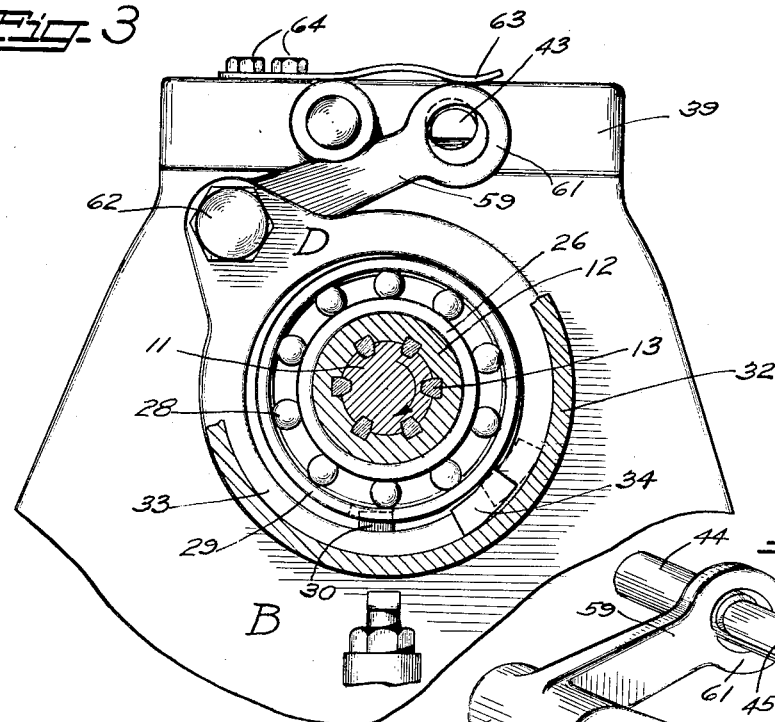
Feb. 20, 1934.    J. G. AUPERIN    1,948,196
AUTOMOBILE LOCKING DEVICE
Filed Aug. 17, 1928    2 Sheets-Sheet 2

Patented Feb. 20, 1934

1,948,196

UNITED STATES PATENT OFFICE 1,948,196

AUTOMOBILE LOCKING DEVICE

Jean G. Auperin, Brooklyn, N. Y.

Application August 17, 1928. Serial No. 300,193

9 Claims. (Cl. 192—4)

My invention relates in general to automobiles and other motor vehicles and more particularly to an improved safety device for preventing backward movement of such a vehicle when the gears are not meshed in reverse.

A principal object of my invention is the provision of a simple, inexpensive locking or safety device adapted to be readily attached to a standard part of a modern motor vehicle and which will effectually and automatically prevent substantial reverse movement of the driving shaft of such a vehicle without assistance from the standard foot or emergency brake, whenever such vehicle is inclined to retrogress when its gears are not in reverse.

Another object of my invention is the provision of such a device or attachment which will not interfere with any part of a standard motor vehicle, nor add appreciably to its cost of manufacture, and which will automatically unlock itself from braking position when the vehicle moves forward again or when the gears are shifted into reverse.

Still another object of my invention is the provision of such an automatic locking device for motor vehicles which may also be used as an emergency brake when the vehicle is travelling upon a descending roadbed and it is desirable to stall the vehicle without the use of either foot brake or emergency brake. For instance, in case the emergency brake should become out of order and the driver should desire to leave the car.

Numerous other objects of the invention will be apparent as it is better understood from the following description, which, taken in connection with the accompanying drawings, discloses a preferred embodiment thereof.

Referring to the drawings:

Fig. 1 is a fragmentary, vertical cross-sectional view taken along the line 1—1 of Fig. 2 and showing details of transmission and universal joint construction and embodying my improved locking device.

Fig. 2 is a vertical sectional view taken along the line 2—2 of Fig. 1 and showing the locking device in inoperative or non-locking position when the gears are in reverse.

Fig. 3 is a view similar to Fig. 2 showing the locking device in operative or locking position when the gears are in neutral, first, second, third or other forward speeds.

Fig. 4 is a perspective view of the locking device.

Fig. 5 is a side elevation or general outside view of the universal joint housing transmission or gear shift housing and part of the clutch mechanism housing, these being the only essential parts of a standard motor vehicle which need be shown for a complete understanding of my invention.

Referring more in detail to the drawings, wherein like reference numerals designate like parts throughout the different views and which illustrate a preferred embodiment of my invention, I have shown in Fig. 5 part of a modern motor vehicle, namely, a clutch mechanism section A, a transmission section B, a universal joint section C, and between B and C my improved locking device D.

Inasmuch as the construction of modern motor vehicles is well known, especially to those skilled in the art, it has been deemed necessary to illustrate only those parts which are essential to a proper understanding of my invention.

With reference to Fig. 1 which shows parts of the transmission and gear shifting mechanisms and universal joint mechanisms, reference numeral 11 indicates the gear shift shaft, normally revolving counter-clockwise when the vehicle is moving forward in first, second, or third gear. The shaft 11 is keyed to the universal joint hub 12 by means of splines 13 and has its reduced and threaded end 14 engaged by a washer 15 and a hexagonal lock nut 16. It revolves on ball bearings, the balls 17 being held in raceways defined by a collar 18 embracing the shaft and a pair of annular race-tracks 19 secured to a sleeve 20 which is supported by an S-shaped annular plate 21 secured to a frame part 22 of the transmission casing B. An outer collar 23 having a recess stuffed with a felt washer 24 adapted to keep out dirt from the raceways 19 and bearing balls 17 is secured to the frame 22 by a bolt and nut connection 25, which bolt also secures the S-shaped annular plate 21 to the frame 22. The universal joint hub 12 keyed to the shaft 11 has a circular ball bearing collar 26 secured to a core part thereof, and held in place by a locking ring 27 threadedly secured to the hub core. A series of bearing balls 28 are held between the collar 26 and another circular ball bearing collar 29 which is loosely arranged between the balls 28 and the inside wall of the ring of the locking device and slightly spaced away from said wall. The collar 29 is recessed on the side which faces the collar 23 to receive the upper end of a rectangular locking plate 30 which is secured to the outer face of the locking device D by a screw 31. The recess of the collar 29 being slightly wider than the width of the locking plate 30, the collar 29 may describe a slight circular motion for a purpose yet to be mentioned. The universal joint hub 12 is recessed to form an annular hub shoulder or brake drum 32. This shoulder or brake drum 32, together with the ball bearing collar 29 defines a circular channel 33 in which a wedge block 34 of the locking device D is adapted to operate. The hub 12 has secured to integral radial extensions 35, by means of bolt and nut connections 36, a universal joint housing C and within the same a series of fibre discs 37 separated from each other by separating washers 38 for the purpose of making connection with the drive shaft (not shown) which extends backward to the differential gear mechanism.

Supported by the transmission housing frame 22, there is an extension 39 comprising a hub 41 and a spring housing 42. A gear shift slide rod 43 having a large diameter section 44 and a small diameter section 45 is adapted to slidingly operate within the hub 41. The section 45 is cut away at 46 to clear the head of the bolt 36. The spring housing 42 is closed by a top plate 49 and contains a compression spring 51 held between the plate 49 and the top surface of a plunger 52 which has a conical cam point 53 adapted to ride into and out of cam notches 54 in the upper part of the rod 43. When the point 53 of the plunger 52 engages the first cam notch 54, counting from the left of Fig. 1, the gears (not shown) in the transmission housing are meshed to reverse the shaft 11. When it engages the second cam notch the gears are not meshed at all, the gear shift being in neutral position, and when it engages the third or rear notch the gears are meshed in third or high speed. A second gear shift rod 55 similar to rod 43, and controlling first and second speed gears in the transmission housing, is shown in Figs. 2, 3, and 5. This slide rod is of one diameter throughout its length and has no direct connection with the locking device D.

Referring now to Fig. 4, the locking device D comprises a circular body or ring 56 of substantial thickness and rectangular in cross section, an integral wedge block 34, already referred to, the ring 56 and wedge block 34 forming in effect a brake shoe, an integral hub extension 57 having a cylindrical pivot hole 58, a lever arm 59 extending transversely from the hub 57 and integral therewith and terminating into a loop 61 adapted to bear upon either the large diameter section 44 of the rod 43 when the transmission gears are in reverse, or upon the small diameter section 45 when the transmission gears are in neutral, first, second, or third speed. Fig. 4 shows the loop 61 bearing upon the large diameter section 44 when the transmission gears are in reverse. The locking device D is pivoted to the frame 22 of the transmission housing by means of a pin bolt 62. A leaf spring 63 secured to the extension 39 by bolts 64 constantly presses downwardly upon the top of the loop 61 and tends to hold the same against the rod 43.

The locking operation of the device D is as follows: When the transmission gears are in reverse, that is to say, when it is desired to reverse the vehicle, the position of the slide rod 43 is as shown in Fig. 1, the point 53 engaging first cam notch 54 and the loop 61 bearing upon the large diameter 44. In this position the locking device D is inoperative, that is to say, the ring 56 is held suspended concentric with the shaft 11, the ball bearing collars 26 and 29 are also concentric with the hub shoulder 32 with the result that the wedge block 34 integral with the ring 56 and operating within the channel 33 does not engage the revolving hub shoulder 32 nor the collar 29. In this position the wedge block 34 does not interfere with the desired reverse movement of the vehicle. When, however, the shift gears are in neutral or the vehicle is moving forward in first, second, third or other forward speed on an ascending roadbed and is brought to a stop, either voluntarily or involuntarily, and the vehicle starts to reverse, that is to say, the shaft 11 together with the hub part 32 start to revolve in the direction of the arrow shown in Fig. 3, the loop 61, because of the forward sliding movement of the rod 43 into neutral or high gear position, is lowered somewhat from its high bearing position upon the large diameter section 44 and is held suspended around the small diameter section 45, thereby lowering the ring 56 and the wedge block 34 out of concentricity with the shaft 11, the collars 26 and 29 and the hub part 32, the wedge block 34 assumes the position shown in Fig. 3 and is wedged between the hub shoulder 32 and the collar 29, the lower front edge of the block engaging the shoulder 32 and the upper rear edge engaging the collar 29. The latter is moved slowly forward by friction a distance equal to the difference in width of the locking plate 30 and the recess of the collar 29, as shown in Fig. 3. This wedging action of the block 34 is almost instantaneous with the slightest reverse movement of the shaft 11 and the hub 12 and effectually stops the shaft and hub and consequently also the drive shaft which connects the universal joint with the differential and the rear wheels. The vehicle is thus stopped from any substantial backward movement without the necessity of either using the foot brake or hand brake. The advantage is obvious. It leaves the driver's foot and hand free for other work. When the roads are crowded with motor vehicles sudden compulsory stops on hills are quite frequent and the presence of my improved automatic locking device in a vehicle is very desirable and advantageous. While the car is stopping on an ascending roadbed, the engine is usually kept running by disengaging the clutch from the crank shaft and the transmission gears are usually shifted to neutral or first speed unless the gears have already been in first speed on a very steep incline. When the vehicle moves forward again, that is to say, when the shaft 11 and the hub 12 are revolving in the opposite direction from that shown in Fig. 3, (counter-clockwise), the block 34 is automatically lifted out of wedging position together with the ring 56. The spring 63, however, counteracts this lifting action and the lower front edge of the block 34 is idly slipping on the inner surface of the shoulder 32, the lifting tendency of the revolving shoulder 32 neutralizing the lowering tendency of the spring 63.

The locking device D may also be employed as an emergency brake when the vehicle is travelling upon a descending roadbed and it is desirable to stall the vehicle without the use of either foot brake or hand brake. This is accomplished by an additional lever arrangement, shown in Fig. 5, and now to be described.

A vertical push rod 65 having a push handle 66, and sliding through a bracket 67, is pivoted at 68 to a bell crank lever 69 which is pivoted at 71 to the clutch mechanism casing 72 and has pivoted to it at 73 a horizontal rod 74 sliding through a bracket 75 against the pressure of a spring 76 which is confined between the bracket 75 and a collar 77, secured to the rod 74 a short distance back of the bracket 75. The rod 74 has its other end pivoted at 78 to a bell crank lever 79 which is pivotally attached at 81 to the frame 22 of the transmission housing B. The crank lever 79 has a hub extension 82 through which extends a threaded pin 83, which terminates at its upper end into a shoe 84. The height of the pin 83 may be adjusted by lock nuts 85. The operation of the mechanism just described is as follows: When it is desired to prevent the further forward movement of the vehicle when same has come to a stop on a descending roadbed without using the hand brake or foot brake or when the hand brake is out of order, the operator presses upon the push button 66, which may be conveniently located at any suitable point within the easy reach of the operator's hand. This will depress the rod 65, pull the rod 74 forward against the spring 76 and will lift the shoe 84 into contact with the lower outer wall of the ring 56, which is thereby raised together with the wedging block 34 against the pressure of spring 63 to substantially the dotted line position shown in Fig. 3, the block 34 being wedged between the hub shoulder 32 and the collar 29 in the opposite direction from that shown in full lines in Fig. 3, thus stopping the vehicle from further forward movement. Before the vehicle is started forward again it will be necessary to place the gears in reverse and slightly back up the vehicle so as to release the wedge block 34 from its wedging position.

I claim:

1. In a motor vehicle, a rotating part, a non-rotating part, and a locking ring having an integral wedge block adapted to automatically wedge between said parts to prevent the vehicle from reverse movement unless the gears are meshed in reverse.

2. In a motor vehicle, a rotating part, a non-rotating part, and a locking ring concentric with said rotating part and inoperative when the vehicle is travelling forward in first, second or third speed and eccentric with said rotating part and adapted to automatically wedge between and lock said parts against reverse movement when the vehicle is stopped on an ascending roadbed while in any of said speeds.

3. In a motor vehicle, in combination, a transmission casing containing a transmission mechanism, a universal joint mechanism, a locking device pivotally secured to said casing and having an integral wedge block adapted to lock a revolving member of one of said mechanisms against reverse movement when the vehicle is stopped while travelling on an ascending roadbed.

4. In a motor vehicle, a transmission casing containing a transmission shaft, a universal joint mechanism, a locking ring having an integral wedge block secured to said casing and being adapted to lock said shaft against reverse movement when the transmission gears are not meshed in reverse.

5. In a motor vehicle, a transmission mechanism, a universal joint mechanism, a locking ring having an integral wedge block between said mechanisms adapted to automatically lock revolving parts of said mechanisms against reverse movement when the vehicle is stopped on an ascending roadbed, said locking device being also adapted to be manually operated to serve as an emergency brake when the vehicle is stopped on a descending roadbed.

6. An auxiliary brake mechanism in a motor vehicle, in combination, a transmission casing containing transmission mechanism including a rotating shaft, a universal joint mechanism, a locking ring encircling said shaft and secured to said casing and having an integral locking device adapted to lock said shaft against reverse movement when the vehicle is stopped while travelling on an ascending roadbed.

7. In a motor vehicle, a rotating part, a non-rotating part and pivotally secured to the latter a locking ring substantially concentric with said rotating part and inoperative when the vehicle is geared in reverse.

8. In a motor vehicle, a rotating part, a non-rotating part and pivotally secured to the latter a locking ring substantially eccentric with said rotating part and in braking position when the vehicle is geared in neutral, first, second and third speeds.

9. In a safety device for automotive vehicles which includes a motor shaft, a driven shaft, and speed change means interposed between said shafts, braking means applied to the driven shaft, including a brake drum, a shoe pivoted adjacent said brake drum and means for rotating it into locking engagement with the drum in response to retrograde rotation of the drum and means for preventing such locking engagement when the speed change means is in reverse, including a member actuated by said speed change means.

JEAN G. AUPERIN.